United States Patent
Tieman et al.

(10) Patent No.: US 8,428,642 B2
(45) Date of Patent: *Apr. 23, 2013

(54) METHOD AND APPARATUS FOR REMOTE VEHICLE COMMUNICATIONS AND CONTROL

(75) Inventors: Craig A. Tieman, Westfield, IN (US); Todd P. Oman, Greentown, IN (US); Michel F. Sultan, Troy, MI (US); Dale L. Partin, Troy, MI (US); Robert W. Schumacher, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 1391 days.

This patent is subject to a terminal disclaimer.

(21) Appl. No.: 12/150,968

(22) Filed: May 2, 2008

(65) Prior Publication Data

US 2009/0275362 A1    Nov. 5, 2009

(51) Int. Cl.
*H04M 1/00*    (2006.01)
(52) U.S. Cl.
USPC ..................................... 455/550.1
(58) Field of Classification Search ........... 455/422.1, 455/426.1, 450, 501, 505, 550.1, 575.1, 404.1, 455/556.1; 340/426.18, 426.19, 426.2; 701/1
See application file for complete search history.

(56) References Cited

U.S. PATENT DOCUMENTS

| | | | |
|---|---|---|---|
| 5,081,667 A * | 1/1992 | Drori et al. | 455/404.1 |
| 5,682,133 A | 10/1997 | Johnson et al. | |
| 6,147,598 A | 11/2000 | Murphy et al. | |
| 6,970,703 B2 | 11/2005 | Fuchs et al. | |
| 7,224,262 B2 | 5/2007 | Simon et al. | |
| 7,593,792 B2 * | 9/2009 | Berg et al. | 701/1 |
| 7,825,780 B2 * | 11/2010 | Pitt | 455/426.1 |

OTHER PUBLICATIONS

European Search Report dated Jul. 17, 2009.

* cited by examiner

*Primary Examiner* — Thanh Le
(74) *Attorney, Agent, or Firm* — Thomas N. Twomey

(57) ABSTRACT

Long-range remote communication and control of a vehicle is achieved with primary and secondary cellular devices provided by the vehicle user. The primary cellular device is retained by the user, while the secondary cellular device is dedicated to the vehicle and placed in a docking station provided in a vehicle instrument panel or console. The vehicle docking station is equipped with typical cell phone electrical interfaces to supply battery charging current and to establish a bi-directional data communication link between the secondary cellular device and an on-board vehicle computer. The secondary cellular device remains activated, and provides a low-cost remotely accessible communication link between the on-board vehicle computer and the primary cellular device or any other phone, provided that specified security conditions are satisfied.

19 Claims, 3 Drawing Sheets

US 8,428,642 B2

METHOD AND APPARATUS FOR REMOTE VEHICLE COMMUNICATIONS AND CONTROL

TECHNICAL FIELD

The present invention relates to remote communications and control for a vehicle, and more particularly to a low-cost method and apparatus utilizing user-provided primary and secondary cellular phones.

BACKGROUND OF THE INVENTION

Short-range remote access and control of a motor vehicle can be achieved with a user-borne low-power RF transceiver such as a so-called "smart key fob". For example, the fob can be used not only to gain entry to the vehicle, but also to start the engine, access vehicle status information, and so forth. Similar functionality can be achieved with a personal communication device such as a cell phone or PDA, as described for example in the U.S. Pat. No. 6,970,703 to Fuchs et al. and the U.S. Pat. No. 7,224,262 to Simon et al., both of which are incorporated herein by reference.

Long-range remote communication and control can be achieved by equipping the vehicle with a cellular transceiver so that a personal communication device such as a cell phone or PDA can communicate with the vehicle via a cellular link. While this approach can reduce vehicle cost by utilizing the battery, display and keyboard of the personal communication device, it requires an on-board cellular transceiver and a separate cellular service contract. This not only increases vehicle and owner cost, but also can lead to owner upgrade expense when advances in communication technology render the on-board equipment obsolete. Accordingly, what is desired is an improved and lower-cost way of achieving long-range remote communication and control for a vehicle with personal communication device.

SUMMARY OF THE INVENTION

The present invention is directed to an improved method and apparatus for achieving long-range remote communication and control for a vehicle with primary and secondary cellular devices provided by the vehicle user. The primary cellular device is retained by the user, while the secondary cellular device is dedicated to the vehicle and placed in a docking station provided in the vehicle instrument panel or console. The docking station is equipped with typical cell phone electrical interfaces to supply battery charging current and to establish a bi-directional data communication link between the secondary cellular device and an on-board vehicle computer such as a body computer. The secondary cellular device remains activated, and provides a low-cost remotely accessible communication link between the on-board vehicle computer and the primary cellular device, provided that specified security conditions are satisfied.

DESCRIPTION OF THE PREFERRED EMBODIMENT

Figure 1:
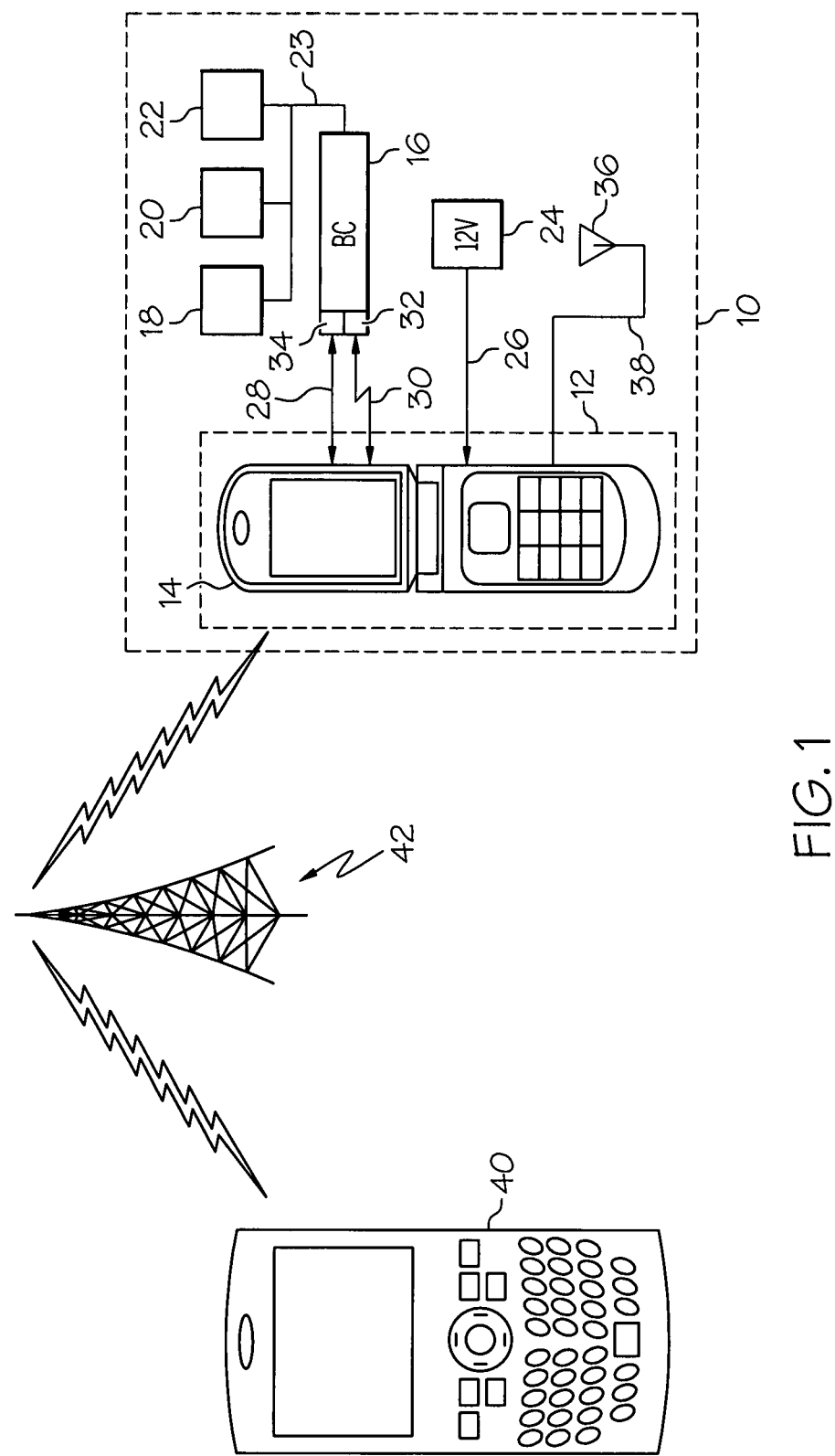
FIG. 1 is a diagram of a bi-directional long-range communication network between a remote user and an on-board vehicle computer according to this invention, including primary and secondary user-provided cellular devices.

Referring to FIG. 1, the reference numeral 10 generally designates a vehicle equipped with a docking station 12 configured to receive a dedicated cell phone 14 (also referred to herein as the secondary cell phone or secondary cellular device) provided by the vehicle owner/operator. The vehicle 10 includes a microprocessor-based controller 16 such as a body computer (BC) that communicates with various other on-board controllers such as security controller 18 and engine controller 20, and various actuators 22 such as power door lock and power window actuators, as indicated by bus 23. Additionally, the vehicle 10 includes a 12-volt switched outlet 24 for supplying power to user-provided electrical accessories.

The docking station 12 functions both to physically support secondary cell phone 14 and to link it to body computer 16 and switched outlet 24. A phone charging cable 26 couples the switched outlet 24 to the charge port of secondary cell phone 14 to charge its internal battery, and a variety of typical wired and wireless communication interfaces are provided to establish a communication link between secondary cell phone 14 and body computer 16. The illustration of FIG. 1 shows both a wired communication link 28 and a wireless communication link 30. The wired communication link 28 may be a digital interface such as a USB or Firewire cable, or an analog interface such as a headset cable. The wireless interface may be an infrared optical link, or a very-short-range RF communication link such as a Bluetooth or IEEE 802.11 WiFi link. In the illustration of FIG. 1, it is assumed that body computer 16 includes internal transceivers 32, 34 for supporting the wired/wireless communication links, but external transceivers may be used instead. Optionally, vehicle 10 may be equipped with a remote antenna 36 for enhancing the signal reception of secondary cell phone 14; in this case, an antenna cable 38 routed between the remote antenna 36 and the docking station 12 couples the remote antenna 36 to a remote antenna port on secondary cell phone 14.

The reference numeral 40 designates a user-provided portable cellular device (also referred to herein as the primary cell phone or primary cellular device) such as a cell phone or PDA that is kept the possession of the user (i.e., the vehicle owner/operator). The reference numeral 42 designates a cellular communication network establishing a cellular communication link between primary cell phone 40 and the secondary cell phone 14 docked in vehicle 10. Through the two cellular devices 14 and 40, network 42, docking station 12, and the communication interfaces 28 or 30, the owner/operator can remotely access vehicle body computer 16. The body computer 16, in turn, is programmed to recognize and accept calls placed to secondary cellular device 40 from primary cellular device 40 by the user, and thereafter to process vehicle-related requests communicated from the primary cellular device 40 to the secondary cellular device 14 for commanding a vehicle action (door locking and unlocking, for example) and/or requesting vehicle status, location or diagnostic data, as described below in reference to FIGS. 2-3. Additionally, the body computer 16 can be programmed to initiate periodic or event-driven communications from the secondary cellular device 14 to the primary cellular device 40 or another cellular or land line phone, as described below in reference to FIG. 4.

While the above-mentioned functionality can be achieved by equipping the vehicle 10 with expensive telematics equipment, as suggested in the above-referenced U.S. Pat. No. 6,970,703 to Fuchs et al. for example, the arrangement of FIG. 1 is superior for at least two reasons. First, the arrangement of FIG. 1 provides a significant cost advantage because expensive OEM or after-market vehicle telematics hardware and the associated cellular service contract are replaced with the simple interfaces 26, 28, 30 shown in FIG. 1, the relatively inexpensive user-provided cellular devices 14, 40, and a user-provided cellular service contract. Typically, the cost savings for the vehicle (including hardware and cellular service) will far exceed the cost of the user-provided cellular devices 14, 40 and cellular service contract. The cost advantage to the user is even more significant in most cases because the user will already have a portable cellular device (primary cellular device 40, for example) and a cellular service contract; and in these cases, the user need only "add a line" (secondary cellular device 14, for example) to the existing cellular service contract. In current markets in the United States, adding a line to an existing cellular service contract costs only a small additional monthly fee (such as $10) and the cost of the additional cellular device 14 (which is usually heavily discounted by the service provider). And second, the arrangement of FIG. 1 avoids the problem that can occur when the expensive OEM or after-market vehicle telematics hardware becomes obsolete due to technology migration. With the disclosed arrangement, the owner/operator can upgrade to new cellular devices 14, 40 at any time, and the on-board interfaces 26, 28, 30 remain unchanged.

Figure 2:
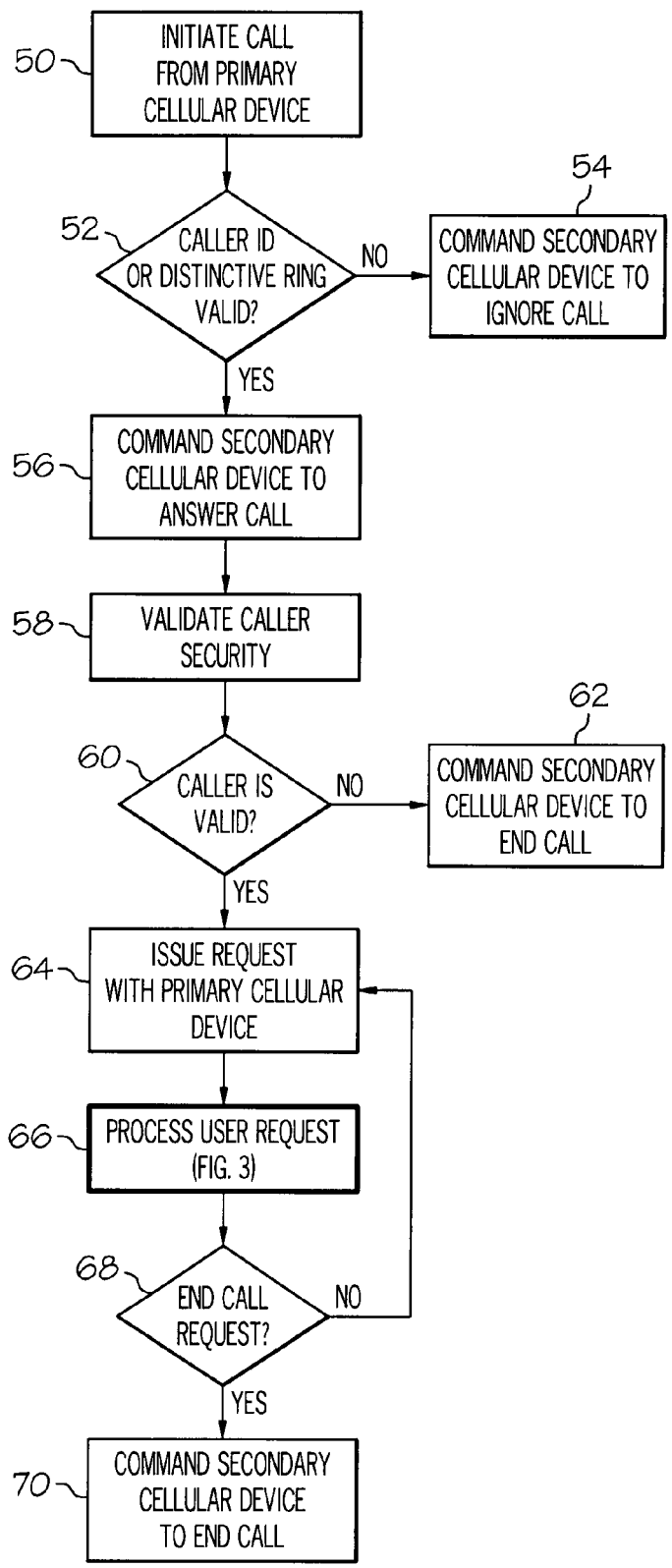
FIG. 2 is a flow diagram depicting an exemplary communication protocol for user-initiated long-range vehicle communication and control according to this invention.
Figure 3:
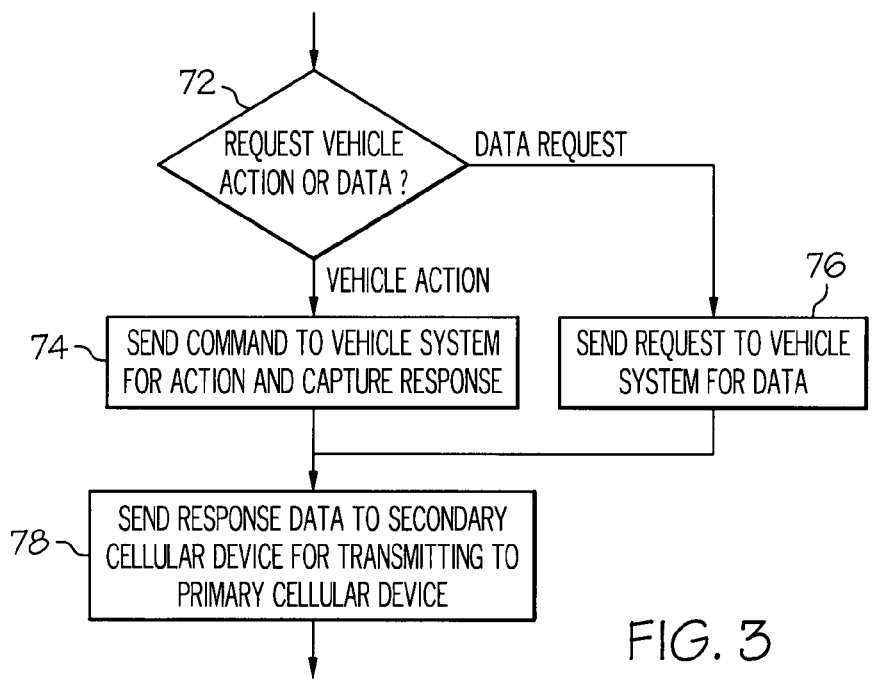
FIG. 3 is a flow diagram detailing a portion of the flow diagram of FIG. 2 concerning the processing of a user request.

The flow diagrams of FIGS. 2-3 illustrate an exemplary process by which the vehicle user can remotely access vehicle body computer 16 for issuing vehicle control commands and/or receiving vehicle status, location or diagnostic information. The process begins at block 50 where the user initiates a call from primary cellular device 40 to secondary cellular device 14. The call may be placed strictly through cellular network 42, or alternately, may be initiated through the internet as a VoIP (Voice over Internet Protocol) communication. As indicated at block 52, the body computer 16 initially screens incoming calls based on caller ID information, or distinctive ring tone if the analog headset interface 28 is used. If the incoming call is not recognized, body computer 16 commands secondary cellular device 14 to ignore the call as indicated at block 54. If the incoming call is recognized, body computer 16 commands secondary cellular device 14 to answer the call, and then verifies that the call is being made by an authorized user, as indicated at blocks 56 and 58. User authorization may be verified through the use of a personal identification number (PIN), a digital encryption key, or even voice recognition of a set password or phrase. If an authorized user cannot be verified, body computer 16 commands secondary cellular device 14 to end the call, as indicated at blocks 60-62. If user authorization is verified, body computer 16 prompts the user to issue a request using voice or prearranged key entries, as indicated at block 64. Body computer 16 processes the user request as indicated at block 66, and then prompts the user to enter the next request. If the next request is an end call request, body computer 16 commands the secondary cellular device 14 to end the call, as indicated at blocks 68-70.

FIG. 3 details block 66 of FIG. 2, which processes user requests once user authorization has been verified. Referring to FIG. 3, body computer 16 first determines if the received request is a request for a vehicle action (such as door locking or unlocking) or a request for data (such as diagnostic data), as indicated at block 72. If the user is requesting a vehicle action, body computer 16 executes blocks 74 and 78 to send the appropriate command to the vehicle system and to issue a confirmation response to primary cellular device 40 via secondary cellular device 14. If the user is requesting data, body computer 16 executes blocks 76 and 78 to obtain the requested data from the appropriate vehicle system and to relay the data to primary cellular device 40 via secondary cellular device 14.

The communication process of FIGS. 2-3 is considered to be exemplary as indicated, and does not explore the many variations that are possible. For instance, the FIGS. 2-3 assume that the user initiates an ordinary cellular network call from primary cellular device 40. However, the call may alternately be placed from a different cellular device, or from any internet-accessible device such as a portable or desktop personal computer using Voice over Internet Protocol (VoIP), for example. Also, many different kinds of user requests are possible. For example, when secondary cellular device 14 has GPS capability, it can be accessed by the primary cellular device 40 to determine the vehicle location, and in conjunction with the GPS capability of the primary cellular device 40, to provide the user with turn-by-turn or line-of-sight directions to find vehicle 10. In a similar vein, a secondary cellular device 14 having GPS-based navigation capability can serve as a low-cost on-board navigation system for vehicle 10. As a further example, if secondary cellular device 14 is equipped with an integral camera, the user can request the secondary cellular device 14 to capture and transmit a digital image to primary cellular device 40 or some other device. While there are many such possibilities, these are considered to be particularly significant because they leverage the capability of secondary cellular device 14 to provide new and desirable functions in vehicles that lack the hardware that would otherwise be required to provide similar functionality. In many cases, the above (and other) functions can be enabled and/or enhanced by downloading custom application software, or applets, into the primary and/or secondary cellular devices 40, 14; for example, applets provided by the vehicle manufacturer or its supplier can be used to provide a custom graphical user interface (GUI) for the primary and/or secondary cellular devices 40, 14.

Figure 4:
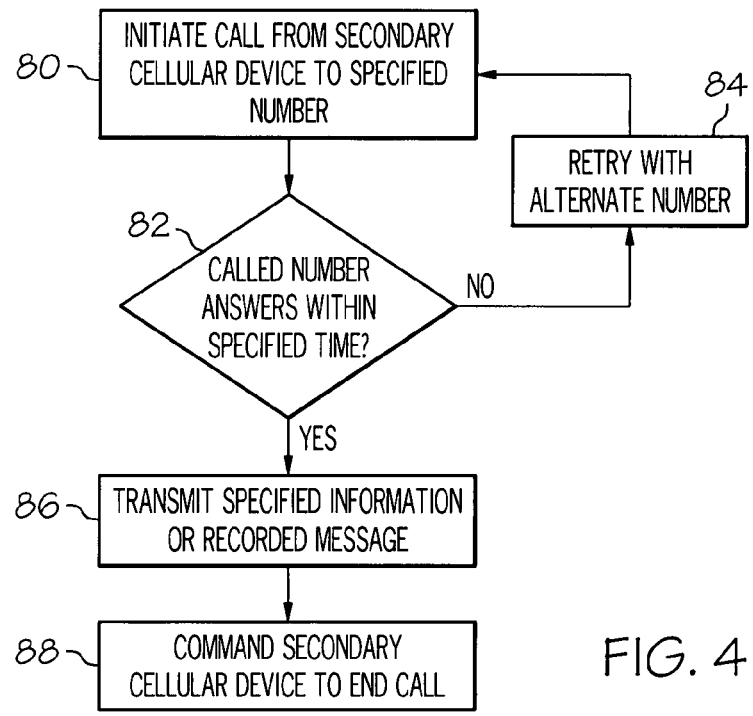
FIG. 4 is a flow diagram depicting an exemplary long-range communication initiated by the on-board vehicle computer of FIG. 1.

The flow diagram of FIG. 4 illustrates an exemplary process by which body computer 16 initiates periodic or event-driven communications to primary cellular device 40 or another cellular or land-line phone. In the case of event-driven communications, the call may be triggered by a detected event such as a break-in attempt or unauthorized use of the vehicle, a crash event, low tire pressure, a vehicle battery disconnect (a potential theft indication), and so on. Usually, the events that trigger a communication are detected by body computer 16, but certain events such as a vehicle battery disconnection can be inferred by the secondary cellular device 14 if there is an apparent failure of the switched outlet 24. In other words, disconnecting the vehicle battery will not necessarily prevent the secondary cellular device 14 from alerting the user or other specified entity that the battery has been disconnected because power for initiating the communication is derived from the internal battery of the secondary cellular device 14.

Referring to FIG. 4, the vehicle-initiated communication process begins at block 80 where body computer 16 initiates a call to primary cellular device 40 or another specified land-line or cellular device using the secondary cellular device 14. Advantageously, the phone number(s) of the outgoing call can vary depending on the nature of the triggering event to ensure that a prompt and suitable response is obtained. Blocks 82-84 indicate that an alternate number can be called if the initially called number fails to answer within a specified time. Once the call is answered, body computer 16 commands secondary cellular device 14 to transmit the specified data or a recorded message, and to end the phone call, as indicated by blocks 86-88.

As with the user-initiated communication example of FIGS. 2-3, the vehicle-initiated communication example of FIG. 4 is specific and does not explore the many variations that are possible. For example, in cases where the secondary cellular device 14 is equipped with a camera, body computer 16 can command the secondary cellular device 14 to capture and transmit a digital image of the vehicle passenger compartment in response to a specified event such as a break-in or unauthorized vehicle use. And as with user-initiated communications, many of the above (and other) vehicle-initiated communications can be enabled and/or enhanced by downloading custom software applets into the primary and/or secondary cellular devices 40, 14.

In summary, the present invention provides an improved and low-cost way of achieving long-range remote communication and control for a vehicle with a primary cellular device or other internet-accessible device. In effect, an inexpensive user-provided secondary cellular device 14 takes the place of expensive on-board OEM or after-market telematics equipment that requires separate cellular service and is prone to obsolescence. Moreover, any functionality embedded in the secondary cellular device 14 such as navigation and digital imaging becomes accessible to a remote user to provide additional functionality without requiring additional on-board equipment and services.

While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. Long-range communication and control apparatus for a vehicle having an on-board electronic controller, comprising:
   a primary cellular device and a secondary cellular device provided by a user of the vehicle; and
   a bi-directional communication link between the secondary cellular device and the on-board electronic controller, the on-board electronic controller being programmed to recognize and accept calls placed to the secondary cellular device from a primary cellular device by the user, verify that a call placed to the secondary cellular device from the primary cellular device is being placed by an authorized user, and thereafter to process vehicle-related requests communicated from the primary cellular device to the secondary cellular device by the authorized user.

2. The long-range communication and control apparatus of claim 1, further comprising:
   a cable linking a docking station in the vehicle for receiving the secondary cellular device to a vehicle power outlet to supply battery charging current from the vehicle power outlet to an internal battery of the secondary cellular device.

3. The long-range communication and control apparatus of claim 2, further comprising:
   a communications cable linking the docking station to the on-board electronic controller to establish the bi-directional communication link.

4. The long-range communication and control apparatus of claim 1, where:
   the bi-directional communication link is a short-range wireless communication link.

5. The long-range communication and control apparatus of claim 1, where:
   the on-board electronic controller is programmed to initiate a communication from the secondary cellular device to the primary cellular device or another device.

6. The long-range communication and control apparatus of claim 5, where:
   the communication initiated by the on-board electronic controller is responsive to a vehicle-related event detected by the on-board electronic controller or another controller or sensor.

7. The long-range communication and control apparatus of claim 1, wherein the call placed to the secondary cellular device from the primary cellular device is verified by a personal identification number.

8. The long-range communication and control apparatus of claim 1, wherein the call placed to the secondary cellular device from the primary cellular device is verified by a digital encryption key.

9. The long-range communication and control apparatus of claim 1, wherein the call placed to the secondary cellular device from the primary cellular device is verified by a spoken password.

10. The long-range communication and control apparatus of claim 9, wherein the spoken password is verified by voice recognition.

11. A long-range communication and control method for a vehicle having an on-board electronic controller, comprising the steps of:
    receiving within the vehicle a secondary cellular device provided by a user of the vehicle;
    establishing a bi-directional communication link between the on-board electronic controller and the secondary cellular device;
    verifying that a call placed to the secondary cellular device from a primary cellular device is being placed by an authorized user; and
    programming the on-board electronic controller to recognize and accept verified calls placed to the secondary cellular device by the user with a primary cellular device, and thereafter to process vehicle-related requests communicated from the primary cellular device to the secondary cellular device by the user.

12. The long-range communication and control method of claim 11, including the step of:
    programming the on-board electronic controller to initiate a communication from the secondary cellular device to the primary cellular device or another device.

13. The long-range communication and control method of claim 12, where:
    the communication initiated by the on-board electronic controller is responsive to a vehicle-related event detected by the on-board electronic controller or another controller or sensor.

14. The long-range communication and control method of claim 11, including the step of:
    supplying battery charging current to an internal battery of the secondary cellular device from a vehicle power outlet.

15. The long-range communication and control method of claim 14, including the step of:
  programming the secondary cellular device to initiate a communication to the primary cellular device or another device in response to an apparent failure of the vehicle power outlet.

16. The long-range communication and control method of claim 11, wherein the call placed to the secondary cellular device from the primary cellular device is verified by a personal identification number.

17. The long-range communication and control method of claim 11, wherein the call placed to the secondary cellular device from the primary cellular device is verified by a digital encryption key.

18. The long-range communication and control method of claim 11, wherein the call placed to the secondary cellular device from the primary cellular device is verified by a spoken password.

19. The long-range communication and control method of claim 18, wherein the spoken password is verified by voice recognition.

* * * * *